Dec. 30, 1924.
H. R. RICARDO
1,520,772
INTERNAL COMBUSTION ENGINE
Filed April 26, 1923
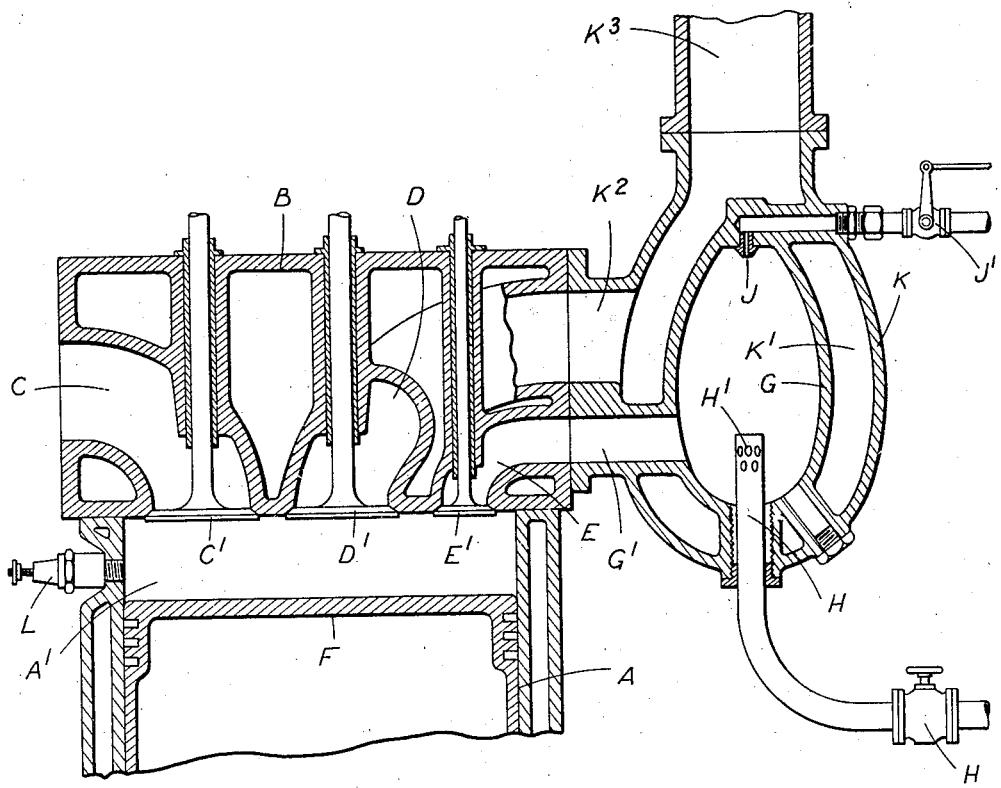

Patented Dec. 30, 1924.

1,520,772

UNITED STATES PATENT OFFICE.

HARRY RALPH RICARDO, OF LONDON, ENGLAND.

INTERNAL-COMBUSTION ENGINE.

Application filed April 26, 1923. Serial No. 634,837.

*To all whom it may concern:*

Be it known that I, HARRY RALPH RICARDO, a subject of the King of England, and residing at London, in England, have invented certain new and useful Improvements in Internal-Combustion Engines, of which the following is a specification.

This invention relates to internal combustion engines employing vaporized liquid fuel and has for its object to obviate certain disadvantages which are inseparable from such engines as now constructed.

Hitherto the fuel has been supplied to the engine cylinder through a vaporizer or carburettor in a homogeneous mixture consisting of the whole of the air and fuel charge or the main air charge has been drawn into the cylinder in an unheated state through one valve, the liquid fuel, with or without a small supply of air, being drawn through a vaporizer through a separate valve.

Where a homogeneous mixture is supplied the whole charge is heated with the result that the weight of the charge is reduced and the tendency to detonation is largely increased. Consequently owing to the increased tendency to detonation the compression ratio is reduced which prevents the liquid fuel being used to the best advantage.

Where the main air supply is drawn in unheated through a separate valve, although only the remaining constituents of the charge are heated, it is impossible to control the power output solely by varying the quantity of liquid fuel supplied while maintaining a full charge of air at all loads because the range of burning on the weak side is extremely limited. This disadvantage is of course equally true where a homogeneous mixture is employed as it is well known that owing to the small range of mixture strength which gives complete combustion when using hydrocarbon fuels, it is impossible when working on a homogeneous charge composed of air and a vaporized liquid fuel, to control the power output except between a very narrow range of torque merely by varying the mixture strength.

According to this invention an engine is provided normally working with a fuel mixture containing air, hydrogen and hydrocarbon fuel, the supply of main air and hydrogen being maintained substantially constant at all loads and the power output being regulated solely by varying the proportion of hydrocarbon fuel in the mixture. To this end the air is supplied to the cylinder by a separate valve and the hydrocarbon fuel and hydrogen are drawn in either through a second valve or in some cases through two separate valves or inlet ports, in that case there being three inlet ports in all.

Thus the air supply may be entirely uncontrolled and the supply of hydrogen maintained constant at all loads and in a particular case the quantity of hydrogen may be just sufficient to run the engine at normal speed on no load without the employment of any hydrocarbon fuel at all, such hydrocarbon fuel being added as the load increases and the power output controlled solely by varying such quantity of hydrocarbon fuel.

By using hydrogen in this manner as a constituent of the charge it is possible to operate the engine economically when using very weak mixtures of hydrocarbon fuel and air, i. e. between the limits where no hydrocarbon fuel is employed and where the maximum mixture strength is used owing to the fact that the rapid combustion and inflammability of the hydrogen, even in weak mixtures, eliminates the slow burning of the charge which would otherwise occur were homogeneous mixtures of hydrocarbon and air employed and were it attempted to employ a mixture strength beyond 20% weaker than complete combustion strength.

Further by supplying hydrogen and hydrocarbon fuel to the engine cylinder through one valve and admitting air through a separate valve all risk of firing back even with extremely weak mixtures is avoided.

It will further be appreciated that as the air supply is kept separate from the passages through which the hydrocarbon vapour is supplied these passages and consequently the vapour itself may be heated to any required extent without heating and therefore reducing the density of the air constituting the major portion of the charge.

According to this invention therefore the liquid hydrocarbon fuel is heated and vaporized in an atmosphere of hydrogen and is admitted to the cylinder without previous admixture with air so that prior to its admission it is non-inflammable.

The particular arrangement of the valve and of the means for regulating the supply of hydrocarbon fuel may be varied in wide limits without departing from this invention.

The accompanying drawing illustrates by way of example one method of carrying the invention into practice the drawing being a somewhat diagrammatic sectional elevation of the head and adjacent parts of the cylinder of an internal combustion engine.

The cylinder A is provided with a water jacketed head B preferably formed detachable. In the head B there are formed three passages C, D and E leading from three ports in the inner side of the cylinder head these ports being controlled respectively by valves C', D' and E'. The outer end of the passage C is conveniently situated at the side of the head B and through this passage air is drawn into the cylinder A on the outstroke of a piston F. The outer ends of the passages D and E also lie in the sides of the head B but are situated conveniently more or less opposite to the air intake passage C. Mounted on the side of the cylinder head is a chamber G of suitable shape and dimensions, a convenient formation being substantially ovoid as shown in the drawing. From one side of this chamber G and preferably the lower portion thereof leads a passage G' which opens into the passage E in the head so that these passages together form a continuous conduit for the flow of gas from within the chamber G into the cylinder A. Into the bottom of the chamber G projects a pipe H the end of which is closed but the pipe has perforations H' formed in its wall adjacent to the end. Hydrogen is delivered into the chamber G through the pipe H. At the top of the chamber G is a nozzle or sprayer J through which paraffin or other suitable liquid hydrocarbon fuel can be delivered into the chamber G. The whole chamber G is enclosed in a casing K arranged so as to provide a jacket space K' around the chamber G. This jacket space K' communicates at K² with the passage D in the head B of the cylinder so that the products of combustion which leave the cylinder through the passage D will flow through the jacket space K' and heat the chamber G. The products of combustion are exhausted through an outlet K³.

A suitable clearance space is provided in the cylinder A preferably as at A' and a sparking plug L is disposed in the cylinder wall surrounding this clearance.

The air entering the cylinder A through the passage C is uncontrolled except by the valve C' and hence a substantially constant amount of air enters the cylinder at each suction stroke of the piston F. Hydrogen is delivered through the pipe H into the chamber G in a substantially constant and uncontrolled quantity the hydrogen being drawn thence into the cylinder A through the passage G' E. Conveniently the amount of hydrogen delivered into the chamber G is such that if the supply of hydrocarbon fuel is completely shut off the engine will continue to run on a mixture of air and hydrogen at a normal no load speed. The hydrogen supply is adjusted by setting of a valve such as H in the supply pipe. The power output of the engine is controlled solely by varying as by a cock J' the supply of hydrocarbon fuel delivered through the nozzle J into the chamber G this fuel being vaporized in this chamber owing to the heating thereof by the products of combustion which flow through the jacket space K'. The vaporized hydrocarbon is drawn into the cylinder with the hydrogen through the passage E when the valve E' is lifted.

In some cases the hydrogen and hydrocarbon fuel may be delivered into the cylinder through separate valve-controlled passages. The supply of hydrocarbon fuel may be controlled by various means as found desirable. The details of construction may be modified in various ways in accordance with the type of engine to which the invention is applied.

What I claim as my invention and desire to secure by Letters Patent is:—

1. A method of operating and controlling an internal combustion engine according to which air and hydrogen are supplied separately to the cylinder and each in substantially constant quantities, while a hydrocarbon fuel is supplied to the cylinder in variable amount, the control of this hydrocarbon supply effecting the control of the power output.

2. In an internal combustion engine the combination of a cylinder, a valve-controlled port through which air only enters and in a substantially constant and uncontrolled quantity at all loads, a valve-controlled port through which hydrogen enters the cylinder in a substantially constant quantity at all loads, means for supplying to the cylinder a hydrocarbon fuel which enters the cylinder through a valve-controlled port, and means for varying the supply of hydrocarbon fuel and thereby controlling the power output of the engine.

3. In an internal combustion engine the combination of a cylinder, a valve-controlled port through which air only enters and in a substantially constant and uncontrolled quantity at all loads, a valve-controlled port through which hydrogen enters the cylinder in a substantially constant quantity at all loads, means for supplying to the cylinder a hydrocarbon fuel which enters the cylinder through the same valve-controlled port as serves to admit the hydrogen, and means for varying the supply of hydrocarbon fuel and thereby controlling the power output of the engine.

4. In an internal combustion engine the combination of a cylinder, a valve-controlled port through which air only enters and in a substantially constant and uncontrolled quantity at all loads, a vaporizer chamber communicating with the cylinder through a valve-controlled port, means for supplying hydrogen to the vaporizer chamber in a substantially constant quantity at all loads, means for supplying liquid hydrocarbon fuel to the vaporizer chamber, and means for controlling the supply of hydrocarbon fuel and thereby controlling the power output of the engine.

5. In an internal combustion engine the combination of a cylinder, a valve-controlled port through which air only enters and in a substantially constant and uncontrolled quantity at all loads, a vaporizer chamber communicating with the cylinder through a valve-controlled port, means for heating the vaporizer chamber by the products of combustion from the cylinder, means for supplying hydrogen to the vaporizer chamber in a substantially constant quantity at all loads, means for supplying liquid hydrocarbon fuel to the vaporizer chamber, and means for controlling the supply of hydrocarbon fuel and thereby controlling the power output of the engine.

In testimony whereof I have signed my name to this specification.

HARRY RALPH RICARDO.